Jan. 22, 1924.
W. S. LA LONDE
1,481,470
ELECTRIC LIQUID LEVEL INDICATOR
Filed Oct. 11, 1920
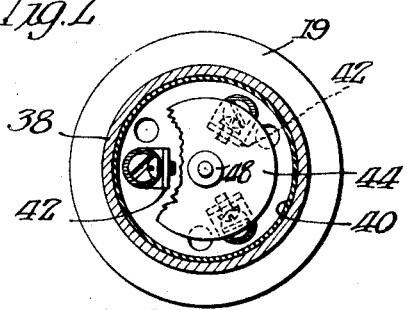
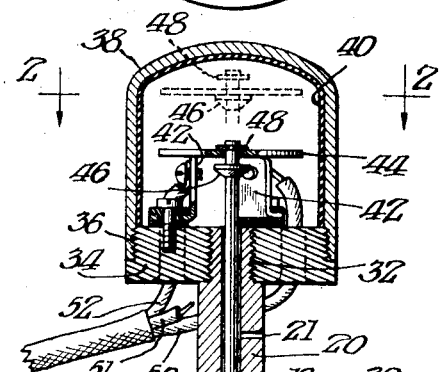
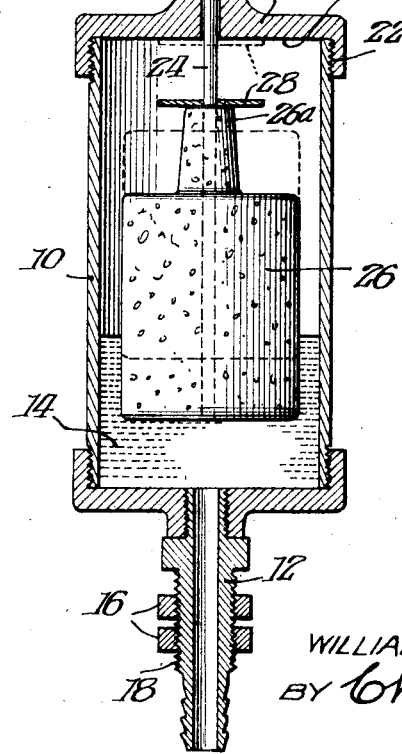
INVENTOR
WILLIAM S. LA LONDE
BY Cheever & Cox
ATTYS.

Patented Jan. 22, 1924.

1,481,470

UNITED STATES PATENT OFFICE.

WILLIAM S. LA LONDE, OF EVANSTON, ILLINOIS.

ELECTRIC LIQUID-LEVEL INDICATOR.

Application filed October 11, 1920. Serial No. 416,279.

*To all whom it may concern:*

Be it known that I, WILLIAM S. LA LONDE, a citizen of the United States, residing at Evanston, in the county of Cook and State of Illinois, have invented a certain new and useful Improvement in Electric Liquid-Level Indicators, of which the following is a specification.

This invention relates to devices attached to any sort of a receptacle containing liquid in varying quantities to indicate by an alarm or the like when the liquid reaches a predetermined level. The object of the invention is to provide a device of this class which is very compact in form, easily and comparatively cheaply made, which is very positive and accurate in operation, and is not liable to get out of order—this particularly in that it is not liable to allow any liquid to escape from its normal receptacle thru the indicating device of this invention. More particularly the invention consists in a very efficient electric switch equipment and in many other features and details of construction which will be hereafter more fully set forth in the specification and claim.

Referring to the drawings in which like numerals denote like parts thruout the several views, Figure 1 is a vertical sectional detail view thru mechanism illustrating this invention in its preferred form.

Figure 2 is a detail plan view taken on the line 2—2 of Figure 1.

In carrying out this invention a supplemental liquid tank 10 is provided adapted for connection at its bottom to a pipe 12 leading to the receptacle containing the liquid whose level is to be indicated, say for instance the radiator of the modern automobile engine where it is important that an alarm be given when and if the level of the water in the radiator goes below a certain point. In attaching a device of this invention to such an automobile radiator the connection is so made that the water or other liquid 14 whose level is to be indicated passes up pipe 12 into the interior of tank 10 and remains in that tank at a given predetermined level until the liquid in the radiator or other receptacle to be indicated reaches the point where an alarm is necessary; this all is well understood in the art, and therefore not shown in detail.

The tank 10 is, however, adjustable vertically with reference to any suitable fixed support, not shown, which extends horizontally between the two nuts 16 screw threaded on the outer circumference of pipe 12, it being only necessary to rotate both of these nuts up or down on thread 18 to make the tank 10 and the entire device assume a different vertical position with reference to said support and with reference to the adjacent main engine radiator or other receptacle whose level of liquid is to be indicated by this device. This adjustment by means of the nut 16 is of importance in insuring the ultimate accurate operation of the device at a given predetermined level of liquid in the receptacle or radiator whose condition is to be indicated.

The supplemental tank, 10 is closed by a cap 19 having a neck 20 screw threaded in place at 22. This cap 19—20 is perforated vertically with a dimension of diameter to allow for the vertical reciprocation of a spindle 24 in a free and easy manner, so as to avoid the possibility of its becoming glued to the bore of the neck 20 by rust impregnated water or other gummy liquid. The lower end of the spindle enters the tank 10 and is suitably connected to a float 26 adapted to rise with liquid 14 in the tank 10. Neck 20 is provided with outwardly directed vent and overflow perforations 21 which allow the escape of air or liquid 14 which may pass valve 28, hereafter referred to. Enclosing the spindle 24 and normally resting upon the upper end portion $26^a$ of the float is a disk valve 28 preferably of flexible material such as leather or rubber adapted when the float is moved to the dotted line position of Figure 1, to, as shown, abut the under surface 30 of the cap 19 and thus make an effective seal to prevent the escape of either liquid 14 or fumes therefrom thru the passage formed in the cap 19 about the spindle 24.

The disk 28 is made of flexible material and as such is of importance in that it permits the valve to seat itself very accurately and tightly on surface 30 notwithstanding any inaccuracy in the vertical alinement of spindle 24 with the bore of the neck 20 or in the surface 30 due to the presence of any reasonable sized particles of dirt or grit which may accidently get in between the valve and the surface.

Suitably attached to the upper end of the neck 20, in the particular case here illustrated, by means of screw threads 32, is a base member 34 having attached thereto by any suitable means as for instance, screw threads 36, a switch enclosing cap 38 of any suitable form, preferably provided as shown with the insulation lining 40. Rising from the upper surface of the base 34 are a plurality, in the particular case here illustrated, three electric terminals 42 adapted in the full line position of Figure 1 to provide a three point suspension for a metal contact plate 44 loosely connected to the end of the rod 24 so that it can rock with reference to the central axis of the spindle 24 and can reciprocate thereon between the collars or flanges 46 and 48 from the dotted line to full line positions of Figure 2 and vice versa. The lower ends of the terminals 42 are each connected to a wire 50, 51, or 52 as the case may be, leading away to other indicating devices to be operated by the device of this invention when the plate 44 is in the full line position of Figure 1 and thereby allow electric current to pass thru this plate from any one of the terminals 42 to either or both of the two other terminals 42.

In the operation of the device parts are so adjusted that when the level of the liquid of the receptacle whose condition is to be indicated reaches the point where it is necessary or desirable to give an alarm, the liquid 14 in tank 10 is in the position shown where the float 26 is low enough down in the tank to cause the plate 44 to engage the contacts 42. This causes the alarm current to be sent thru the wires 50–51–52. Whenever the operator notes the alarm he supplies more liquid in the receptacle whose condition is being indicated, the float 26 rises from the position shown in full lines and ultimately reaches the position shown in dotted line in which condition the valve plate 28 engages the surface 30, thus preventing the escape of liquid 14 up around the spindle 24 into engagement with the switch device enclosed within cap 38. Lowering the level of liquid in the receptacle whose condition is to be indicated causes the float to return from the the dotted line to the full line position, and when that position is reached again give the alarm.

Having thus described my invention what I claim as new and desire to secure by Letters Patent, is:—

In mechanism of the class described, a liquid containing tank having a perforation in its top, a float in the tank, a reduced axial extension on the upper end of the float, an axial spindle carried by the float and slidably engaged through the perforation in the top of the tank, and a flexible disk valve carried by the spindle and seated on the upper end of the float extension for sealing the perforation in the top of the tank when the float reaches its extreme upper position, said flexible disk valve being of greater diameter than the extension of the float whereby the outer portion of said valve is forced into sealing engagement with the top by direct liquid pressure against the bottom thereof.

In witness whereof, I have hereunto subscribed my name in the presence of two witnesses.

WILLIAM S. LA LONDE.

Witnesses:
 DWIGHT B. CHEEVER,
 ANNA ROSENTHAL.